United States Patent
Dai et al.

(10) Patent No.: US 8,693,415 B2
(45) Date of Patent: Apr. 8, 2014

(54) METHOD AND APPARATUS FOR SENDING RANK INDICATION INFORMATION, RECEIVING METHOD AND APPARATUS THEREOF

(75) Inventors: Bo Dai, Shenzhen (CN); Chunli Liang, Shenzhen (CN); Peng Hao, Shenzhen (CN); Shuqiang Xia, Shenzhen (CN); Guanghui Yu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 399 days.

(21) Appl. No.: 12/991,262

(22) PCT Filed: Jul. 3, 2009

(86) PCT No.: PCT/CN2009/072629
§ 371 (c)(1),
(2), (4) Date: Nov. 5, 2010

(87) PCT Pub. No.: WO2010/009651
PCT Pub. Date: Jan. 28, 2010

(65) Prior Publication Data
US 2011/0134860 A1     Jun. 9, 2011

(30) Foreign Application Priority Data
Jul. 24, 2008 (CN) ............... 2008 1 0133765

(51) Int. Cl.
*H04W 4/00* (2009.01)
*H04L 5/00* (2006.01)
*H04W 72/04* (2009.01)

(52) U.S. Cl.
CPC ......... *H04L 5/0053* (2013.01); *H04W 72/0413* (2013.01); *H04W 72/0406* (2013.01); *H04W 72/04* (2013.01)
USPC ............................ 370/329; 370/328; 370/338

(58) Field of Classification Search
CPC ........... H04L 5/0053; H04W 72/0406; H04W 72/0413
USPC ............................................. 370/329
See application file for complete search history.

(56) References Cited

U.S. PATENT DOCUMENTS

2009/0059844 A1 * 3/2009 Ko et al. ............ 370/328
2009/0111480 A1 * 4/2009 Wu et al. .......... 455/452.2

(Continued)

FOREIGN PATENT DOCUMENTS

| CN | 101330306 A | 12/2008 |
| CN | 101330307 A | 12/2008 |

(Continued)

OTHER PUBLICATIONS

Supplementary European Search Report in European application No. 09799966.8, mailed on Nov. 30, 2011.

(Continued)

*Primary Examiner* — Asad Nawaz
*Assistant Examiner* — Najeebuddin Ansari
(74) *Attorney, Agent, or Firm* — Ming Chow; Sinorica, LLC

(57) ABSTRACT

The present invention discloses a method and an apparatus for sending rank indication (RI) information, and a method and an apparatus for receiving RI information, wherein the method for sending the RI information includes: carrying the RI information on a physical uplink control channel (PUCCH) for transmitting scheduling request (SR) information when the RI information and the SR information are sent within a same subframe, and sending the RI information and the SR information by using the PUCCH for transmitting SR information. According to the present invention, the problem that the orthogonality of codes between PUCCHs is destroyed due to that the RI information and the SR information are sent within a same subframe is solved, the overall system performance thereby can be guaranteed.

1 Claim, 8 Drawing Sheets

(56) References Cited

U.S. PATENT DOCUMENTS

| | | | |
|---|---|---|---|
| 2009/0196229 A1* | 8/2009 | Shen et al. | 370/328 |
| 2009/0232067 A1* | 9/2009 | Pajukoski et al. | 370/329 |
| 2009/0290549 A1* | 11/2009 | Tiirola et al. | 370/329 |
| 2010/0002664 A1* | 1/2010 | Pan et al. | 370/338 |
| 2010/0091755 A1* | 4/2010 | Kwon et al. | 370/344 |
| 2010/0183086 A1* | 7/2010 | Ko et al. | 375/260 |
| 2011/0211510 A1* | 9/2011 | Kim et al. | 370/311 |

FOREIGN PATENT DOCUMENTS

| | | |
|---|---|---|
| EP | 2077677 A1 | 7/2009 |
| RU | 2303330 C1 | 7/2013 |
| WO | 2008050467 A1 | 5/2008 |
| WO | 2010002642 A1 | 1/2010 |

OTHER PUBLICATIONS

"Multiplexing between Rank and SR", 3GPP Draft; R1-081455, 3rd Generation Partnership Project (3GPP), Mobile Competence Centre.
"Multiplexing between Rank and SR", 3GPP Draft; R1-081854, 3rd Generation Partnership Project (3GPP), Mobile Competence Centre.
"Procedures for collisions between periodic and aperiodic CQI/PMI/RI reports and Draft CR to 36.213" 3GPP Draft; R1-082523, 3rd Generation Partnership Project (3GPP), Mobile Competence Centre.
3GPP Draft; R1-082836, Remaining Issues With RI Multiplexing on PUCCH, 3rd Generation Partnership Project (3GPP), Mobile Competence Centre.
3GPP Draft; R1-083603, Remaining Issues With RI Multiplexing on PUCCH, 3rd Generation Partnership Project (3GPP), Mobile Competence Centre.
"Procedures for resolving collisions between SR and periodic CQI reports and Draft CR to 36.213, 36.212 and 36.211" 3GPP Draft; R1-082806, 3rd Generation Partnership Project (3GPP), Mobile Competence Centre.
"Procedures for resolving collisions between SR and periodic CQI reports and Draft CR to 36.213, 36.212 and 36.211" 3GPP Draft; R1-083514, 3rd Generation Partnership Project (3GPP), Mobile Competence Centre.
International Search Report in international application No. PCT/CN2009/072629, mailed on Oct. 1, 2009.
English Translation of the Written Opinion of the International Search Authority in international application No. PCT/CN2009/072629, mailed on Oct. 1, 2009.
3rd Generation Partnership Project; Technical Specification Group Radio Access Network; Evolved Universal Terrestrial Radio Access (E-UTRA); Physical layer procedures (Release 8).
Texas Instruments, Simultaneous ACK/NAK and SR Transmission in Uplink, 3GPP R1-080709 Feb. 15, 2008.
Motorola, ACK/NACK and SR Multiplexing in PUCCH, 3GPP R1-080085 Jan. 18, 2008.
Nokia Siemens Networks et al., Simultaneous transmission of ACK/NAVK and SR, 3GPP R1-080932 Feb. 15, 2008.
Texas Instruments, Sounding Reference Signal in Support of Scheduling Request in E-UTRA, 3GPP R1-074142 Oct. 12, 2007.
Physical Channels and Modulation (Release 8) Jun. 18, 2011.

* cited by examiner

METHOD AND APPARATUS FOR SENDING RANK INDICATION INFORMATION, RECEIVING METHOD AND APPARATUS THEREOF

TECHNICAL FIELD

The present invention relates to the field of communications, specifically to a method and an apparatus for sending rank indication information and, a method and an apparatus for receiving rank indication information.

BACKGROUND

A multiple-input multiple-output (MIMO) technology is a key technology for the $3^{rd}$ generation (3G) and $4^{th}$ generation (4G) mobile communication systems, it can expand system capacity, improve transmission performance and integrate with other physical layer technologies well. However, when channel correlation is strong, diversity gain and multiplexing gain brought by multiplex channels will greatly decline, thus causing a significant drop in MIMO system performance. At present, a new MIMO precoding method has been proposed. This method is an efficient way of MIMO multiplexing, in which an MIMO channel is divided into several independent virtual channels through precoding at the receiving and sending ends, thus effectively eliminating the impact of the channel correlation. Therefore, the precoding technology can guarantee the stability of an MIMO system in various environments.

A long term evolution (LTE) system is an important $3^{rd}$ generation partnership project. The precoding technology is realized in the LTE by setting a codebook (a precoding matrix set) between a user equipment (UE) and an evolved node base (eNodeB), the UE selects an optimal precoding matrix from the codebook according to a certain criterion (e.g. throughput maximization or the right singular matrix closest to a channel matrix), and feeds back a precoding matrix indicator (PMI) to the eNodeB. The eNodeB finds out the corresponding precoding matrix from the codebook according to the received PMI, and performs precoding transmission during downlink sending by using the precoding matrix; in addition, it is also necessary to feed back rank indication (RI) information over an uplink channel, and the RI information denotes the maximum number of symbols transmitted on one subcarrier.

FIG. 1 is a structure diagram illustrating a basic frame structure in an LTE system. As shown in FIG. 1, the frame structure can be divided into four grades, which are radio frame, half-frame, subframe, and time slot and symbol; wherein one radio frame is 10 ms long and consists of two half-frames; every half-frame is 5 ms long and consists of 5 subframes; every subframe is 1 ms long and consists of 2 time slots; and every time slot is 0.5 ms long.

When normal cyclic prefixes are used in the LTE system, one time slot contains 7 uplink/downlink symbols, each of which is 66.7 us long, wherein the cyclic prefix (CP) of the first symbol is 5.21 us long, and the cyclic prefix of each of other 6 symbols is 4.69 us long.

When extended cyclic prefixes are used in the LTE system, one time slot contains 6 uplink/downlink symbols, each of which is 66.7 us long, wherein the cyclic prefix of each symbol is 16.67 us long.

A resource element (RE) is a subcarrier in an orthogonal frequency division multiplexing (OFDM) symbol, while a downlink resource block (RB) consists of 12 continuous subcarriers and 7 continuous OFDM symbols (if the CP is long, then the number of OFDM symbols is 6), which occupies 180 kHz in the frequency domain and has a time length of a normal time slot in the time domain. FIG. 2 is a structure diagram illustrating resource blocks of bandwidth 5 MHz in an LTE system. As shown in FIG. 2, resource allocation is performed by taking a resource block as a basic unit.

When a target user feeds back RI information, if the target user does not need to send any data, then the RI information is transmitted over a physical uplink control channel (PUCCH); and if the target user needs to send data, then the RI information is transmitted over a physical uplink shared channel (PUSCH).

The PUCCH has six formats, which are format 1, format 1*a*, format 1*b*, and format 2, format 2*a* and format 2*b*. The format 1 is used for transmitting 1-bit scheduling request (SR) information, denoting whether there is an SR or not; the format 1*a* is used for transmitting 1-bit single-code-stream acknowledgement/negative acknowledgement (ACK/NACK) information; the format 1*b* is used for transmitting 2-bit double-code-stream ACK/NACK information, wherein each code stream corresponds to 1-bit ACK/NACK information; the format 2 is used for transmitting channel quality indicator (CQI)/PMI and RI information; the format 2*a* is used for transmitting CQI/PMI and RI information and single-code-stream ACK/NACK information, and it is used in the scenario that the cyclic prefix is a normal cyclic prefix; the format 2*b* is used for transmitting CQI/PMI and RI information and double-code-stream ACK/NACK information, and it is used in the scenario that the cyclic prefix is a normal cyclic prefix. FIG. 3 is a diagram illustrating the frequency domain location of a physical uplink control channel in an LTE system. As shown in FIG. 3, every PUCCH occupies resources of two resource blocks; the RI information is 1 bit or 2 bit long, and only the RI information will be sent when the RI information and the CQI/PMI information are sent within a same subframe.

For a normal cyclic prefix and an extended cyclic prefix, the channel structure of the PUCCH format 1 is described as follows.

FIG. 4 is a channel structure diagram of PUCCH format 1 when a normal cyclic prefix is used. As shown in FIG. 4, in a normal cyclic prefix, a constant amplitude zero auto correlation (CAZAC) sequence of length 12 is selected as a basic sequence. One CAZAC sequence is mapped onto 12 frequency domain locations of each symbol in one resource block. Time domain spectrum spread is performed on the CAZAC sequence through a wash orthogonal code of length 4, and the four spread CAZAC sequences are mapped onto symbols (#0, #1, #5, #6) of a time slot; then time domain spectrum spread is performed on the CAZAC sequence through a Discrete Fourier Transform (DFT) orthogonal code of length 3, and the three spread sequences are mapped onto symbols (#2, #3, #4) of the time slot. Wherein the CAZAC sequences after 3 times time domain spectrum spread are used as reference signals (RSs) of the PUCCH, and the CAZAC sequences after 4 times time domain spectrum spread are used for data transmission on the PUCCH.

FIG. 5 is a channel structure diagram of PUCCH format 1 when an extended cyclic prefix is used. As shown in FIG. 5, in an extended cyclic prefix, a CAZAC sequence of length 12 is selected as a basic sequence. One CAZAC sequence is mapped onto 12 frequency domain locations of each symbol in one resource block. Time domain spectrum spread is performed on the CAZAC sequence by using a wash orthogonal code of length 4, and the four spread CAZAC sequences are mapped onto symbols (#0, #1, #4, #5) of a time slot, then time domain spectrum spread is performed on the CAZAC sequence by using a wash orthogonal code of length 2, and the two spread sequences are mapped onto symbols (#2, #3) of the time slot. Wherein the CAZAC sequences after 2 times time domain spectrum spread are used as RSs of the PUCCH, and the CAZAC sequences after 4 times time domain spectrum spread are used for data transmission on the PUCCH.

Every PUCCH format 1 channel corresponds to a frequency domain location (resource block index), the above-mentioned basic sequence and the time domain spread spectrum code, with which every PUCCH format 1 channel can be determined. Whether to send the PUCCH format 1 channel or not determines whether there is SR information.

In the LTE system, uplink data are sent by way of single-carrier frequency-division multiple access (SC-FDMA), uplink resources to be mapped are therefore required to be continuous, and all data sent in every symbol, after being modulated, will go through DFT and be mapped to corresponding frequency domain locations. Moreover, if two or more PUCCH formats are sent within a same subframe, inter-symbol interference will happen and the orthogonality of codes between PUCCHs can not be guaranteed, so the system performance will decline. At present, in the existing technologies no specific solution has been proposed for a method for sending RI information and SR information within a same subframe.

SUMMARY

The present invention is proposed in consideration of the fact existing in related technologies that a technology is needed to solve the problem of sending RI information and SR information within a same subframe. For this reason, the main purpose of the present invention is to provide a method and an apparatus for sending rank indication (RI) information and a method and an apparatus for receiving the RI information to solve the problem.

A method for sending RI information is provided according to one aspect of the present invention.

The method for sending RI information according to the embodiments of the present invention includes: when RI information and SR information are sent within a same subframe, carrying the RI information on a physical uplink control channel (PUCCH) for transmitting SR information, and sending the RI information and the SR information by using the PUCCH for transmitting SR information.

Wherein the process of sending the RI information and the SR information by using the PUCCH for transmitting SR information may specially include: modulating the RI information to acquire a modulation symbol; multiplying the modulation symbol by every data sequence on the PUCCH for transmitting SR information; and mapping the multiplied sequence onto a target carrier and sending the multiplied sequence.

Preferably, if the RI information is 1 bit, then binary phase shift keying (BPSK) modulation may be performed on the RI information; if the RI information is 2 bit, then quadrature phase shift keying (QPSK) modulation may be performed on the RI information.

A method for receiving RI information is provided according to one aspect of the present invention.

The method for receiving RI information according to the embodiments of the present invention includes: detecting whether there exists a PUCCH for transmitting SR information, wherein SR information and RI information are carried on the PUCCH for transmitting SR information; if the PUCCH for transmitting SR information is detected, acquiring the SR information and decoding the PUCCH to acquire modulation symbol information; and demodulating the modulation symbol information to acquire the RI information.

A method for sending RI information is provided according to one aspect of the present invention.

The method for sending RI information according to the embodiments of the present invention includes: when RI information and SR information are sent within a same subframe, sending the SR information by using a PUCCH for transmitting SR information, and not sending the RI information.

A method for sending RI information is provided according to one aspect of the present invention.

The method for sending RI information according to the embodiments of the present invention includes: when RI information and SR information are sent within a same subframe, sending the SR information and the RI information by using a physical uplink shared channel (PUSCH).

An apparatus for sending RI information is provided according to one aspect of the present invention.

The apparatus for sending RI information according to the embodiments of the present invention includes: a carrying module, which is used for, when RI information and SR information are sent within a same subframe, carrying the RI information on a PUCCH for transmitting SR information; and a sending module, which is used for sending the RI information and the SR information by using the PUCCH for transmitting SR information.

An apparatus for receiving RI information is provided according to one aspect of the present invention.

The apparatus for receiving RI information according to the embodiments of the present invention includes: a detecting module, which is used for detecting whether there exists a PUCCH for transmitting SR information, wherein SR information and RI information are carried on the PUCCH for transmitting SR information; an acquiring module, which is used for decoding the PUCCH to acquire the SR information and modulation symbol information when the PUCCH for transmitting SR information is detected; and a demodulating module, which is used for demodulating the modulation symbol information to acquire the RI information.

Through at least one of above-mentioned technical solutions in the present invention, the problem that the orthogonality of codes between PUCCHs is destroyed because of sending RI information and SR information within a same subframe is solved, the overall performance of a system thereby can be guaranteed.

BRIEF DESCRIPTION OF THE DRAWINGS

The drawings are used to provide further understanding to the present invention, and constitute a part of this specification. The drawings are used together with the embodiments of this invention to explain the present invention, and do not constitute any limitation to the present invention. In the drawings.

DETAILED DESCRIPTION

Function Overview

According to embodiments of the present invention, the proposed technical solution is that: when sending RI information, carrying the RI information on a PUCCH for transmitting SR information for sending, or not sending the RI information, or sending the RI information by using a PUSCH; when receiving the RI information, after the PUCCH for transmitting SR is detected, acquiring the SR information, decoding the PUCCH, and acquiring and demodulating modulation symbol information to acquire the RI information. This solution solves the problem that the orthogonality of codes between PUCCHs is destroyed because of sending RI information and SR information within a same subframe, thereby guaranteeing the overall performance of a system.

The present invention will be described in details with reference to the drawings hereinafter. It should be noted that embodiments in this application and the characteristics in these embodiments can be combined with each other if they don't conflict with each other.

Method Embodiments

A method for sending RI information is provided according to embodiments of the present invention.

Figure 6:
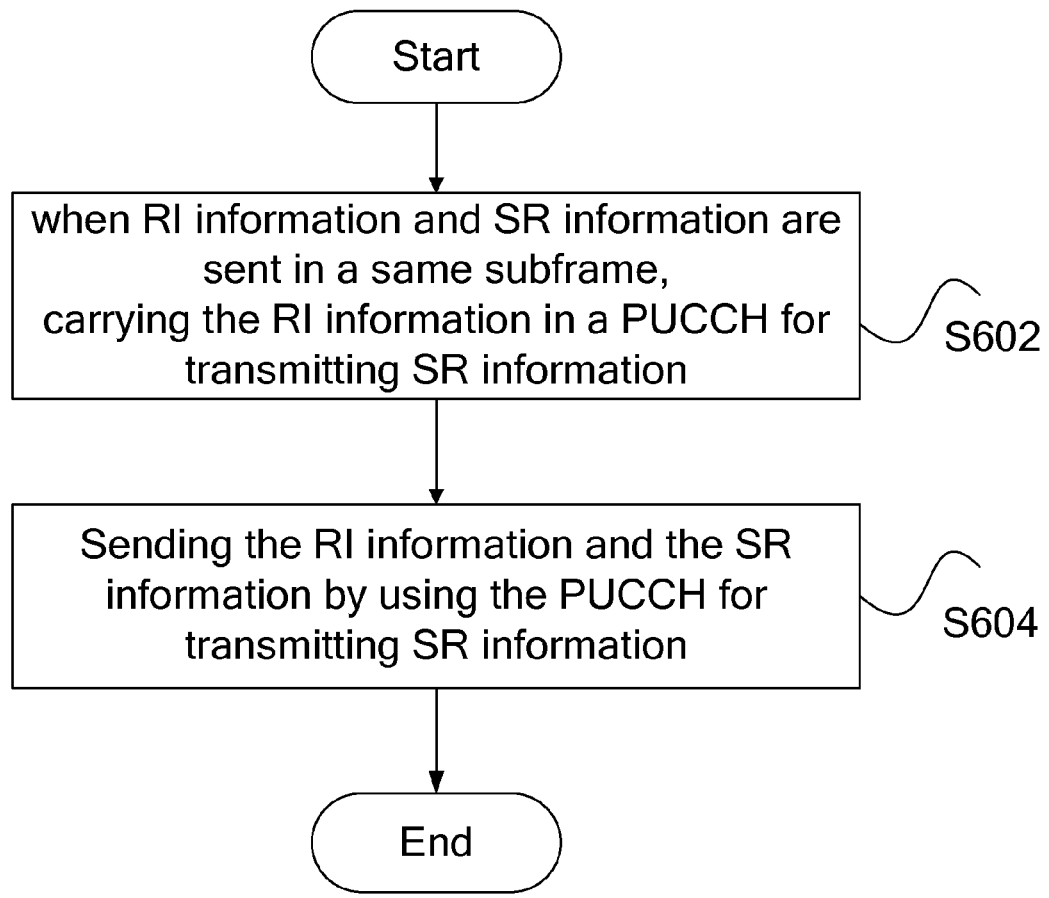
FIG. 6 is a flowchart of a method for sending RI information according to embodiments of the present invention.

FIG. 6 is a flowchart of the method for sending RI information according to the embodiments of the present invention. As shown in FIG. 6, the method includes the following steps S602 to S604:

step S602, when RI information and SR information are sent within a same subframe, carrying the RI information on a PUCCH for transmitting SR information; and step S604, sending the RI information and the SR information by using the PUCCH for transmitting SR information.

By using the technical solution provided according to the embodiments of the present invention, the problem that the orthogonality of codes between PUCCHs is destroyed because of sending RI information and SR information within a same subframe is solved, the overall performance of a system thereby can be guaranteed.

Wherein in step S604, the process of sending the RI information and the SR information by using the PUCCH for transmitting SR information specifically includes: modulating the RI information to acquire a modulation symbol; multiplying the modulation symbol by every data sequence on the PUCCH for transmitting SR information; and mapping the multiplied sequence onto a target carrier and sending the multiplied sequence.

In addition, if the RI information is 1 bit, then BPSK modulation is performed on the RI information; and if the RI information is 2 bit, then QPSK modulation is performed on the RI information.

Figure 7:
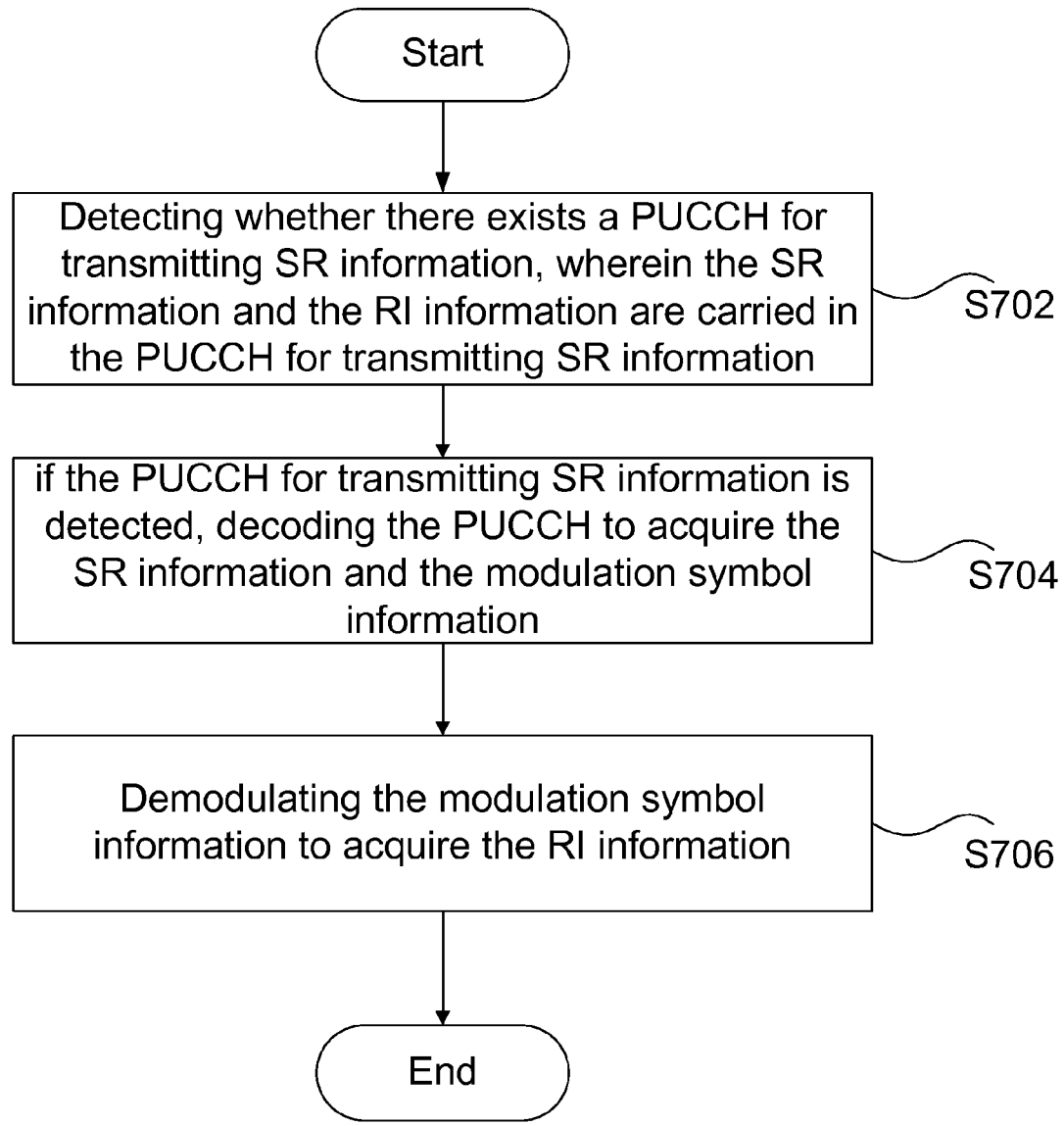
FIG. 7 is a flowchart of a method for receiving RI information according to embodiments of the present invention.

FIG. 7 is a flowchart of a method for receiving RI information according to embodiments of the present invention. As shown in FIG. 7, the method includes the following steps S702 to S706:

step S702, detecting whether there exists a PUCCH for transmitting SR information, wherein the SR information and the RI information are carried on the PUCCH for transmitting SR information;

step S704, if the PUCCH for transmitting SR information is detected, acquiring the SR information, decoding the PUCCH to acquire the modulation symbol information; and step S706, demodulating the modulation symbol information to acquire the RI information.

Figure 1:
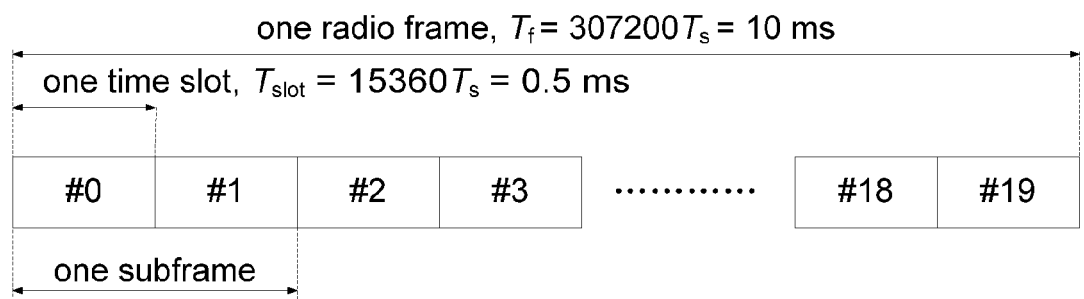
FIG. 1 is a structure diagram illustrating a basic frame structure in an LTE system according to related technologies.
Figure 2:
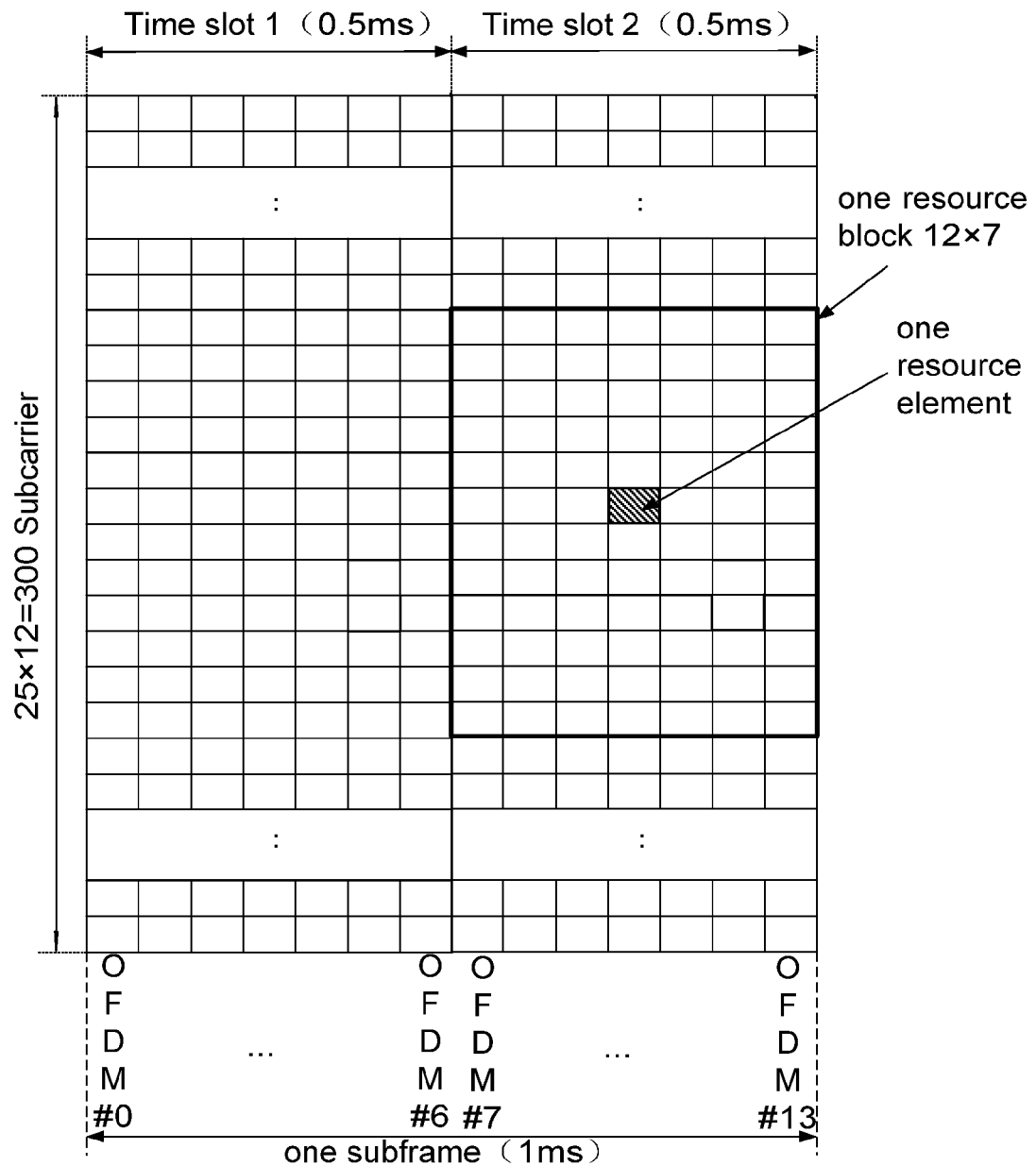
FIG. 2 is a diagram illustrating resource blocks of bandwidth 5 MHz in an LTE system according to related technologies.
Figure 3:
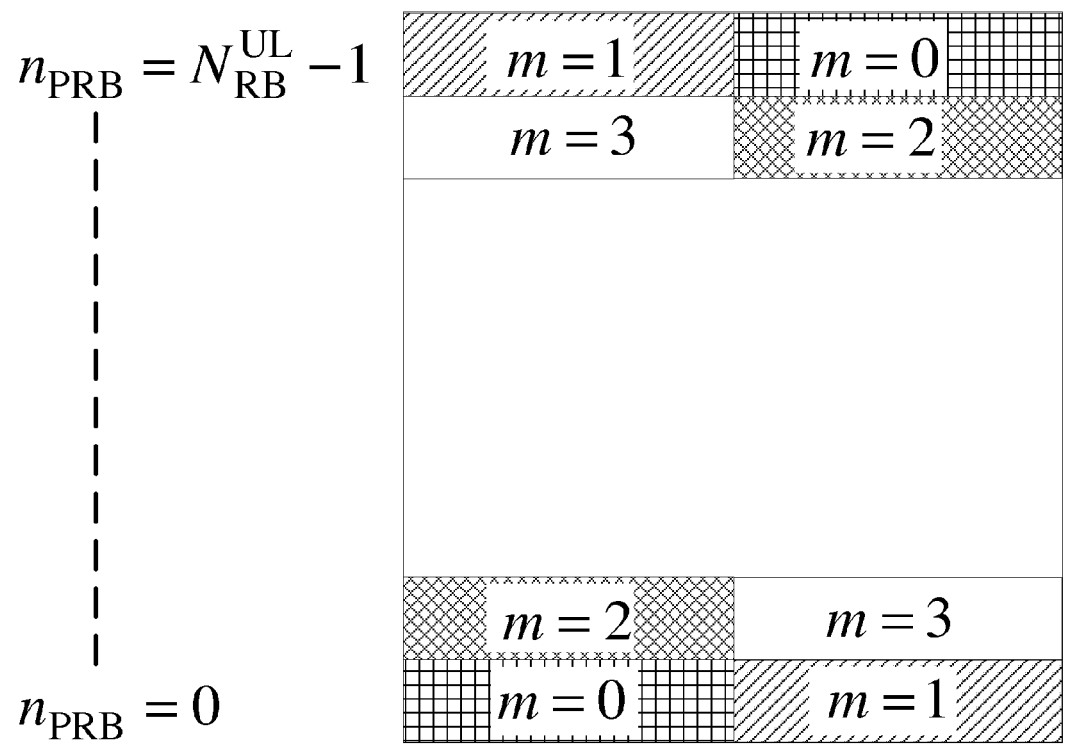
FIG. 3 is a diagram illustrating the frequency domain location of a physical uplink control channel in an LTE system according to related technologies.
Figure 4:
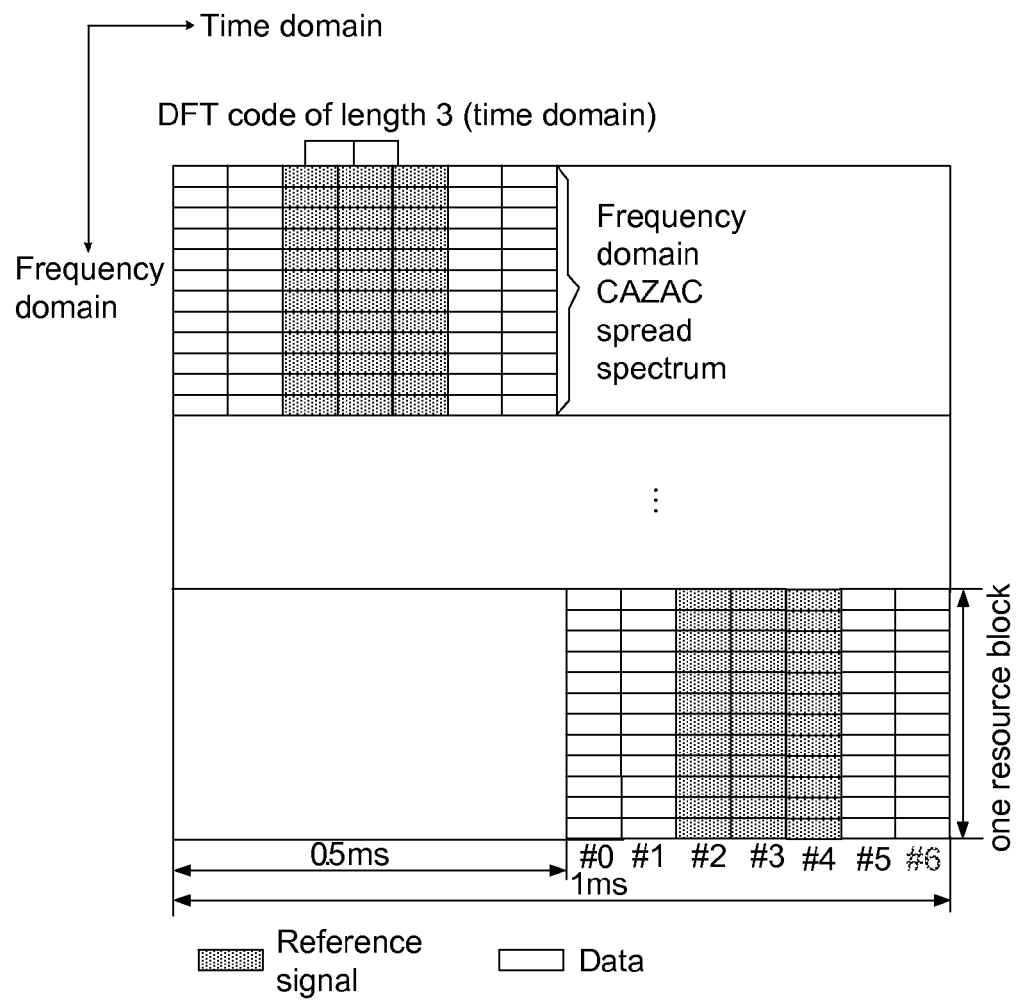
FIG. 4 is a channel structure diagram of PUCCH format 1 when a normal cyclic prefix is used in a system according to related technologies.
Figure 5:
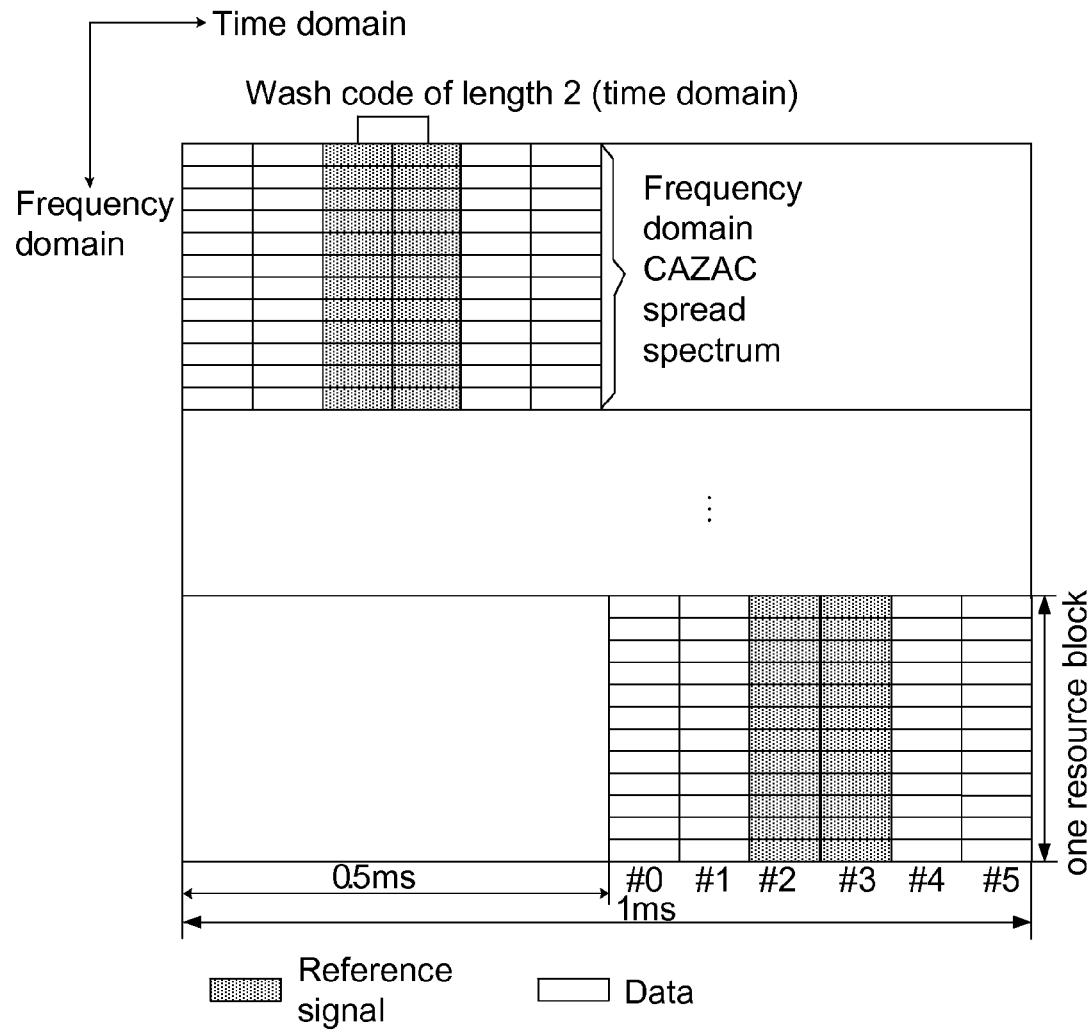
FIG. 5 is a channel structure diagram of PUCCH format 1 when an extended cyclic prefix is used in a system according to related technologies.

FIG. 2 is a structure diagram of resource blocks in a 3GPP LTE system of bandwidth 5M. As shown in FIG. 2, the system includes a total of 512 subcarriers, wherein 300 subcarriers in the middle are available; every resource block includes 12 continuous subcarriers, so the 3GPP LTE system of bandwidth 5M comprises a total of 25 resource blocks. If the number of the available uplink resource blocks is $N_{RB}^{UL}$, all the resource blocks are numbered from low to high with 0, 1, 2, ..., $N_{RB}^{UL}-1$ according to the frequency domain sequence, $n_{PRB}$ denotes a resource block index, then the frequency domain location of the PUCCH numbered with m is as shown in FIG. 3. The embodiments of the present invention will be described hereinafter in details by taking the 3GPP LTE system of bandwidth 5M as an example.

Example 1

For a target user, when the RI information and the SR information are sent within a same subframe, the embodiments of the present invention will be described in two scenarios as follows:

scenario 1: the target user has no SR information to be sent; under the circumstances, the target user may transmit the RI information by using a PUCCH for transmitting RI information without need of using the PUCCH for transmitting SR information, i.e. according to the current criterion, the target user transmits the RI information by using the PUCCH for transmitting RI information, where the PUCCH for transmitting RI information is allocated to the user by the eNodeB; and scenario 2: the target user has SR information to be sent; under the circumstances, the target user may transmit the RI information by using the PUCCH for transmitting SR information, where the PUCCH for transmitting SR information is allocated to the user by the eNodeB, and the specific process is as follows: first, the RI information to be transmitted is modulated to acquire the modulation symbol, the acquired modulation symbol is multiplied by the data sequence on the PUCCH for transmitting SR information (format 1), i.e. the modulation symbol is multiplied by every datum in the data sequence respectively to determine a multiplied result, where the multiplied result is a new data sequence; at last, the multiplied result is mapped onto a target carrier and is sent to the eNodeB; the eNodeB detects whether there exists the PUCCH for transmitting SR information according to the frequency domain location (the resource block index), the basic sequence and the time domain spread spectrum code; if the PUCCH exists, then it means that the target user has SR information to be sent, while if the PUCCH does not exist, then it means that the target user has no SR information to be sent; when the eNodeB detects the PUCCH, it acquires the new data sequence sent by the target user, parses the new data sequence by using reference signals, and makes cross-correlation computation with the new data sequence by using the basic sequence saved locally to acquire a peak value, and demodulates the acquired peak value to acquire the RI information.

A method for sending RI information is provided according to the embodiments of the present invention. In the method, when RI information and SR information are sent within a same subframe, the RI information is sent by using a PUCCH for transmitting SR information.

A method for sending RI information is provided according to the embodiments of the present invention. In the method, when RI information and SR information are sent within a same subframe, the SR information is sent by using a PUCCH for transmitting SR information, and the RI information is not sent.

Example 2

The present invention is described hereinafter still by taking the 3GPP LTE system of bandwidth 5M in the Example 1 as an example. For a target user, when the PUCCH for transmitting RI information and the PUCCH for transmitting SR information are sent within a same subframe, the embodiments of the present invention will be described in two scenarios as follows:

scenario 1: the target user has no SR information to be sent; under the circumstances, the target user may transmit the RI information by using the PUCCH for transmitting RI information, where the PUCCH for transmitting RI information is allocated to the user by the eNodeB; and scenario 2: the target user has SR information to be sent; under the circumstances, the target user may transmit the SR information by using the PUCCH for transmitting SR information and not send the RI information, where the PUCCH for transmitting SR information is allocated to the user by the eNodeB.

A method for sending RI information is provided according to the embodiments of the present invention. In the method, when RI information and SR information are sent within a same subframe, the SR information and the RI information are sent by using a PUSCH.

Example 3

The present invention is described hereinafter still by taking the 3GPP LTE system of bandwidth 5M in the Example 1 as an example. For a target user, when the PUCCH for transmitting RI information and the PUCCH for transmitting SR information are sent within a same subframe, the embodiments of the present invention will be described in two scenarios as follows:

scenario 1: the target user has no SR information to be sent; under the circumstances, the target user may transmit the RI information by using the PUCCH for transmitting RI information, where the PUCCH for transmitting RI information is allocated to the user by the eNodeB; and scenario 2: the target user has SR information to be sent; under the circumstances, the target user may transmit the SR information and the RI information at the same time by using the PUSCH that is allocated to the user by the eNodeB.

A computer-readable medium is provided according to the embodiments of the present invention. Computer-executable instructions are saved in the computer-readable medium. When the instructions are executed by a computer or processor, the computer or processor will execute all steps as shown in FIG. 6 and FIG. 7, and preferably, one or more of the above-mentioned Examples 1 to 3 can be executed.

Device Embodiments

An apparatus for sending RI information is provided according to embodiments of the present invention.

Figure 8:
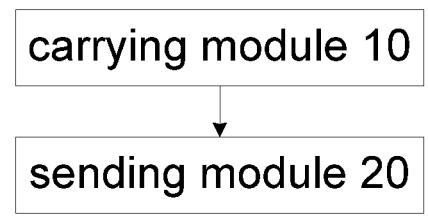
FIG. 8 is a structure block diagram of an apparatus for sending RI information according to embodiments of the present invention.

FIG. 8 is a diagram illustrating the apparatus for sending RI information according to the embodiments of the present invention. As shown in FIG. 8, the apparatus includes:

a carrying module 10, which is used for, when RI information and SR information are sent within a same subframe, carrying the RI information on a PUCCH for transmitting SR information; and a sending module 20, which is used for sending the RI information and the SR information by using the PUCCH for transmitting SR information, where the sending module can be connected to the carrying module 10.

The apparatus for sending RI information provided according to the embodiments of the present invention solves the problem that the orthogonality of codes between PUCCHs is destroyed because of sending the RI information and the SR information within a same symbol, thereby guaranteeing the overall performance of the system.

An apparatus for receiving RI information is provided according to embodiments of the present invention.

Figure 9:
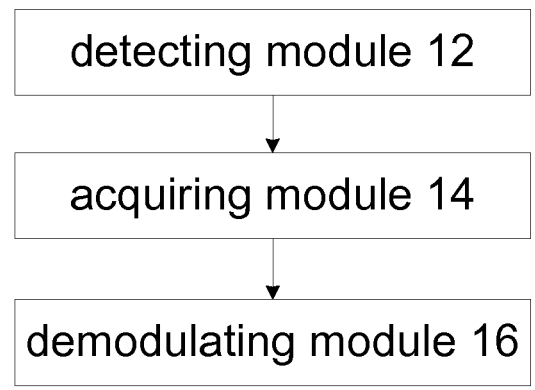
FIG. 9 is a structure block diagram of an apparatus for receiving RI information according to embodiments of the present invention.

FIG. 9 is a diagram illustrating the apparatus for receiving RI information according to the embodiments of the present invention. As shown in FIG. 9, the apparatus includes:

a detecting module 12, which is used for detecting whether there exists a PUCCH for transmitting SR information, wherein SR information and RI information are carried on the PUCCH for transmitting SR information;

an acquiring module 14, which is used for, if the PUCCH for transmitting SR information is detected, acquiring the SR information, then decoding the PUCCH to acquire modulation symbol information, where the acquiring module can be connected to the detecting module 12; and a demodulating module 16, which is used for demodulating the modulation symbol information to acquire the RI information, where the demodulating module can be connected to the acquiring module 14.

As mentioned above, in virtue of the method and apparatus for sending RI information and the method and apparatus for receiving RI information provided by the present invention, the problem that the orthogonality of codes between PUCCHs is destroyed because of sending the RI information and the SR information within a same symbol is solved, thereby the overall performance of a system can be guaranteed.

The above descriptions are only preferred embodiments of the present invention, rather than limit the present invention, as to those skilled in the art, various modifications and changes can be made to the present invention. Any modification, equivalent substitute and improvement within the spirit and principle of the present invention should be included in the protection scope of the present invention.

What is claimed is:

1. A method for sending rank indication information, including:

when rank indication information and scheduling request information are sent within a same subframe, carrying the rank indication information on a physical uplink control channel Format 1, and sending the rank indication information and the scheduling request information by using the PUCCH Format 1;

wherein the process of sending the rank indication information and the scheduling request information by using the PUCCH Format 1 specially includes:

modulating the rank indication information to acquire a modulation symbol;

multiplying the modulation symbol by every data sequence on the PUCCH Format 1; and mapping the multiplied sequence onto a target carrier and sending the multiplied sequence;

wherein if the rank indication information is 1 bit, then Binary Phase Shift Keying modulation is performed on the rank indication information; and if the rank indication is 2 bit, then Quadrature Phase Shift Keying modulation is performed on the rank indication information.

* * * * *